United States Patent
Sasagawa

(10) Patent No.: US 9,426,332 B2
(45) Date of Patent: Aug. 23, 2016

(54) INFORMATION PROCESS APPARATUS FOR CONVERTING ORIGINAL INFORMATION TO CONCEALED INFORMATION FOR TRANSMISSION

(71) Applicant: Oki Data Corporation, Tokyo (JP)

(72) Inventor: Yujiro Sasagawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/802,292

(22) Filed: Jul. 17, 2015

(65) Prior Publication Data

US 2016/0088191 A1 Mar. 24, 2016

(30) Foreign Application Priority Data

Sep. 19, 2014 (JP) ................................. 2014-191425

(51) Int. Cl.
*G06K 15/00* (2006.01)
*H04N 1/44* (2006.01)
*H04N 1/00* (2006.01)
*G06F 3/12* (2006.01)

(52) U.S. Cl.
CPC .............. *H04N 1/4446* (2013.01); *G06F 3/121* (2013.01); *G06F 3/1273* (2013.01); *G06F 3/1285* (2013.01); *H04N 1/00392* (2013.01); *G06F 3/1222* (2013.01); *G06F 3/1238* (2013.01); *H04N 2201/0094* (2013.01)

(58) Field of Classification Search
None
See application file for complete search history.

(56) References Cited

U.S. PATENT DOCUMENTS

| 8,472,042 B2* | 6/2013 | Tokumoto | G06K 15/02 358/1.14 |
| 2007/0061583 A1* | 3/2007 | Kanatsu | H04K 1/00 713/176 |
| 2007/0076238 A1* | 4/2007 | Odagiri | G06F 21/608 358/1.14 |
| 2007/0081189 A1* | 4/2007 | Kamei | G06F 21/6209 358/1.18 |
| 2008/0013727 A1* | 1/2008 | Uemura | H04N 1/448 380/243 |
| 2008/0309992 A1* | 12/2008 | Kimura | H04N 1/4406 358/474 |

FOREIGN PATENT DOCUMENTS

JP 2012-178650 A 9/2012

* cited by examiner

*Primary Examiner* — Dung Tran
(74) *Attorney, Agent, or Firm* — Muncy, Geissler, Olds & Lowe, P.C.

(57) ABSTRACT

An information process apparatus includes a memory part that records original information relating to an image, a conversion process part that converts the original information into concealed information in which at least a piece of the original information is concealed, a concealed information providing part that provides the concealed information to an outside the information process apparatus, and a corresponding information providing processing part that creates corresponding information in which the original information corresponds to the concealed information, and provides the corresponding information to the outside the information process apparatus.

15 Claims, 13 Drawing Sheets

| Information | Execution of Concealment |
|---|---|
| User Info. | Effective |
| Log Info. | Ineffective |

| Information | Elements | Concealment Level |
|---|---|---|
| User Info. | User Name | Distinguishable |
| | Mail Account | Distinguishable |
| | Mail Domain | Distinguishable |
| | Telephone No. | Only Presence or Absence |
| | Department | Completely Concealed |
| | ⋮ | ⋮ |

| Item Name | Effective / Ineffective |
|---|---|
| Concealed Info. Is Also Displayed During Providing Concealed Info. | Effective |

Fig. 6

| |
|---|
| Complete Concealment |
| Only Presence or Absence |
| Distinguishable |
| No Concealment |

Concealment Setting

User Info. [effective]
    User Name    [distinguishable]
    Mail Account    [distinguishable]
    Mail Domain    [distinguishable]
    Telephone No.    [only presence or absence]
    Department    [completely concealed]
Log Info. [ineffective]
    ...    ...
    ...    ...

Concealed Info. Is Also Displayed During Providing Concealed Information [effective]

| Info. Classification | Info. Name (Before Concealment) | Info. Name (After Concealment) |
|---|---|---|
| User Name | KATO | U1 |
| User Name | MATSUMOTO | U2 |
| User Name | INOUE | U3 |
| ... | ... | |
| Domain | hoge.jp | D1 |
| Domain | foo.jp | D2 |

| User Name | Telephone No. | Mail Address |
|---|---|---|
| KATO | 111-1111 | kato@hoge.jp |
| MATSUMOTO | 222-2222 | [blank] |
| INOUE | [blank] | inoue@hoge.jp |
| FUJII | 555-5555 | fujii@foo.jp |

| User Name | Telephone No. | Mail Address |
|---|---|---|
| U1 | * | E1@D1 |
| U2 | * | [blank] |
| U3 | [blank] | E2@D1 |
| U4 | * | E3@D2 |

| Time | Function | User Name | Destination |
|---|---|---|---|
| 2014/10/01 10:00 | Print | MATSUMOTO | - |
| 2014/10/01 13:00 | Print | KATO | - |
| 2014/10/01 17:15 | ScanToEmail | KATO | inoue@hoge.jp |
| 2014/10/02 10:00 | ScanToFax | MATSUMOTO | 555-5555 |

| Time | Function | User Name | Destination |
|---|---|---|---|
| 2014/10/01 10:00 | Print | U2 | - |
| 2014/10/01 13:00 | Print | U1 | - |
| 2014/10/01 17:15 | ScanToEmail | U1 | E2@D1 |
| 2014/10/02 10:00 | ScanToFax | U2 | * |

| Time | Function | User Name | Destination |
|---|---|---|---|
| 2014/10/01 10:00 | Print | MATSUMOTO (U2) | - |
| 2014/10/01 13:00 | Print | KATO (U1) | - |
| 2014/10/01 17:15 | ScanToEmail | KATO (U1) | inoue (E2) @hoge.jp (D1) |
| 2014/10/02 10:00 | ScanToFax | MATSUMOTO (U2) | 555-5555 (*) |

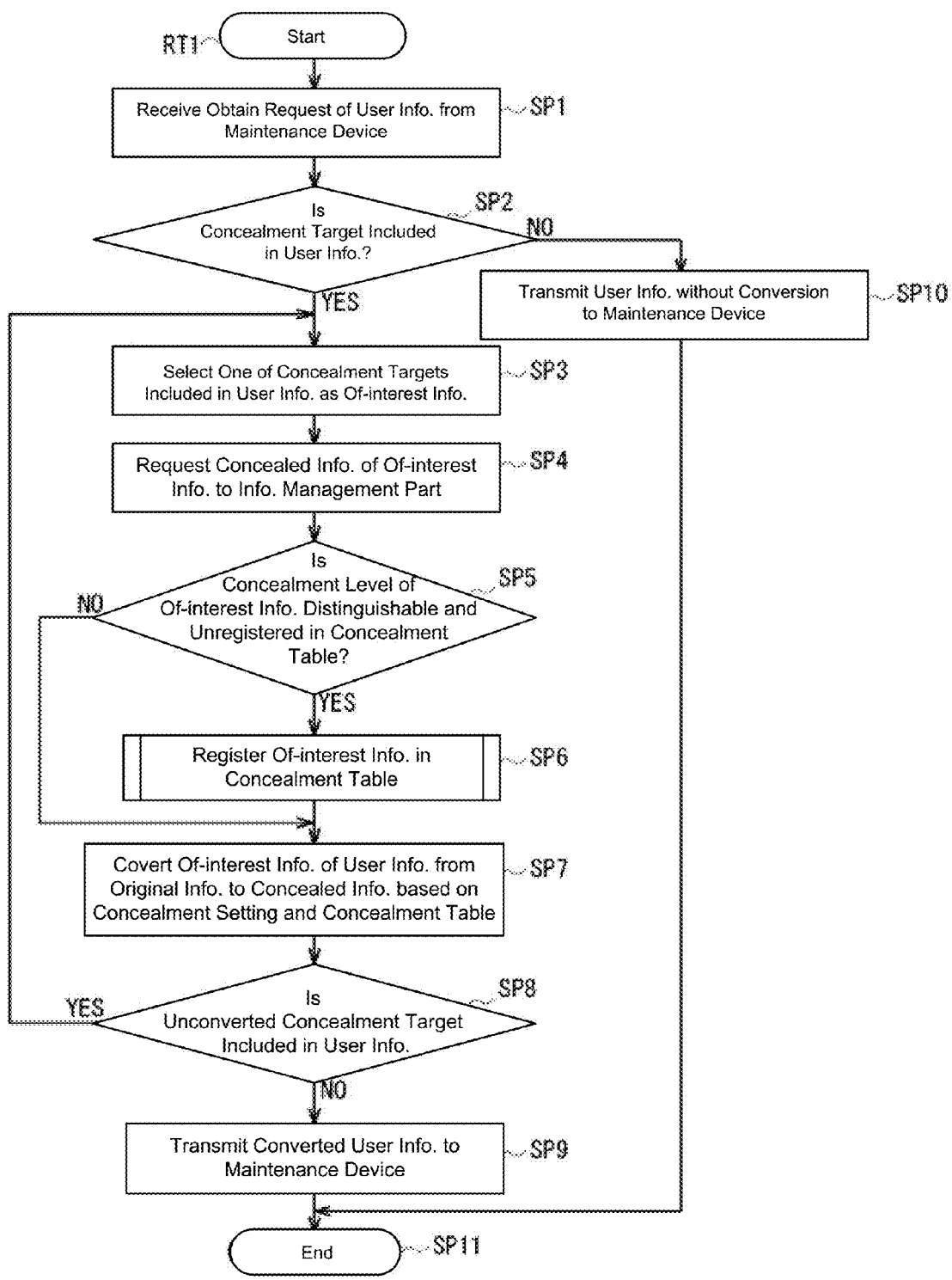

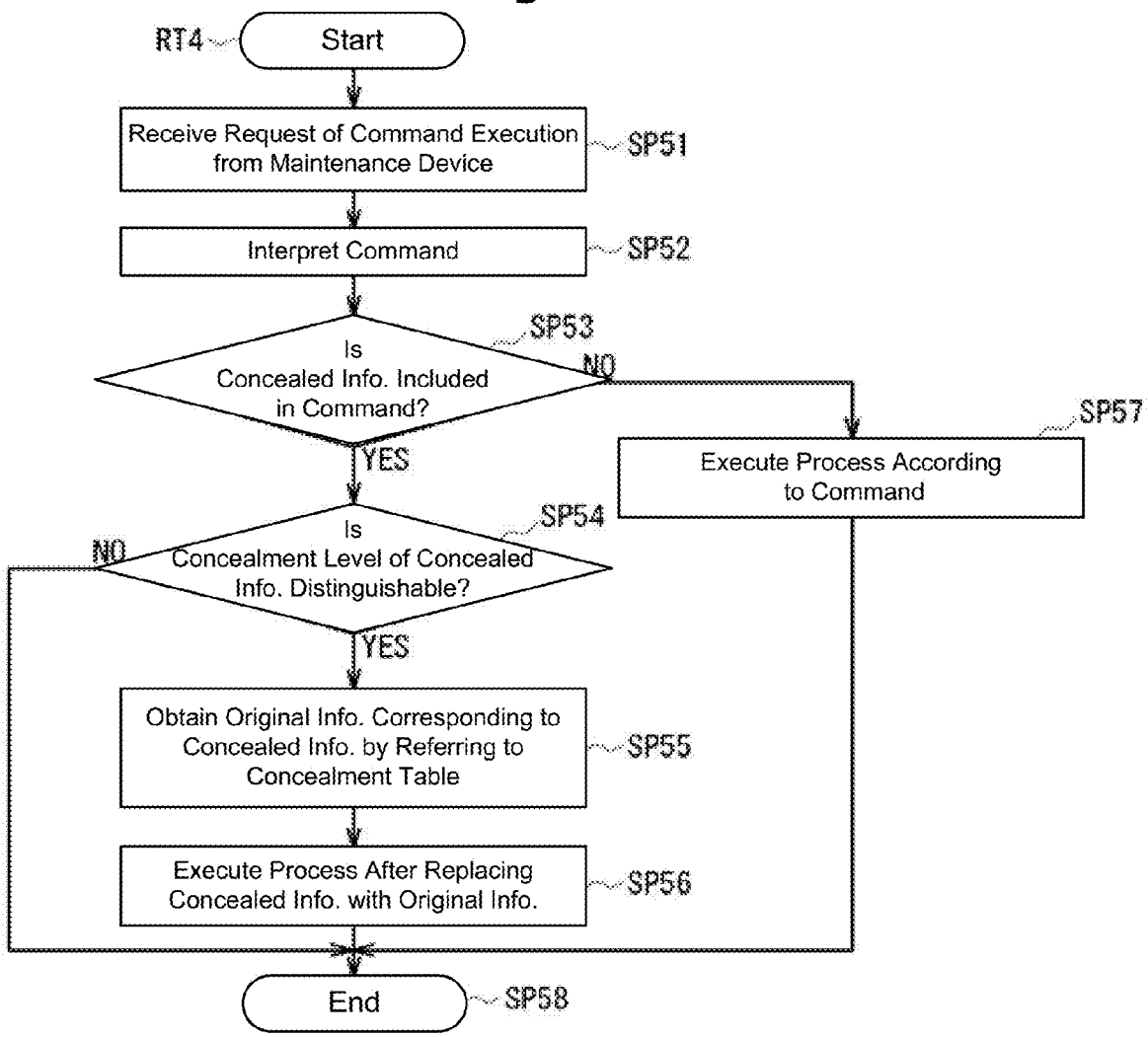

Fig. 15A

| Seed Value | 1111 |
|---|---|

| Original Info. | Concealed Info. |
|---|---|
| KATO | U3994 |
| MATSUMOTO | U6107 |
| INOUE | U2350 |
| ⋮ | ⋮ |

Fig. 15B

| Seed Value | 3456 |
|---|---|

| Original Info. | Concealed Info. |
|---|---|
| KATO | U1182 |
| MATSUMOTO | U5468 |
| INOUE | U7003 |
| ⋮ | ⋮ |

| Date | Time | Seed Value |
|---|---|---|
| 2014/09/01 | 18:00:00 | 1111 |
| 2014/10/01 | 12:30:00 | 3456 |
| 2014/11/01 | 20:50:00 | 8080 |
| ⋮ | ⋮ | ⋮ |

INFORMATION PROCESS APPARATUS FOR CONVERTING ORIGINAL INFORMATION TO CONCEALED INFORMATION FOR TRANSMISSION

CROSS REFERENCE

The present application is related to, claims priority from and incorporates by reference Japanese Patent Application No. 2014-191425, filed on Sep. 19, 2014.

TECHNICAL FIELD

The present invention relates to an information process apparatus suitably applied to, for example, a print system for transmitting image data from a computer to a printer for printing.

BACKGROUND

Conventionally, a printer that is connected to a computer via a network for performing printing based on a print command and image data transmitted from the computer is widely spread. Further, among printers, there are printers which record various information, such as user information for allowing only users having appropriate use authority to use it, log information which is an operation history, etc.

Further, among printers, there are printers that are integrated into a print system, connected to a management device, etc., operated by an external maintenance operator via a wide area network such as the Internet, etc., to transmit information such as setting information, a log., etc., to the management device. Here, in the log, information that is desired to be concealed from the outside, such as a user name and a mail address for performing authentication processing in a printer, for example (hereinafter referred to as "concealment target"), can be included.

Therefore, in some printers, a printer which converts each character of a concealment target into a predetermined symbol (for example, "*", etc.) and transmits them to prevent the concealment target from being notified to the outside is proposed (for example, see Patent Document 1).

PRIOR ART DOCUMENT

Patent Document

[Patent Document 1] Japanese Unexamined Patent Application Publication No. 2012-178650 (FIG. 3)

However, in this case, in setting information, log, etc., to be obtained by a maintenance operator, that is, in information after a conversion, since each character of information, such as a user name, a mail address, etc., that is uniquely assigned to a plurality of users are all converted into the same symbol, it is difficult to distinguish between them.

Especially in a case in which the maintenance operator conducts exchanges with a user of a printer via a telephone and electronic mail, a user name, a mail address, etc., cannot be identified on the maintenance operator's side, making it difficult to communicate each other. As a result, there was a problem that the maintenance operator could not perform a detailed maintenance operation in which a user name and a mail address are identified, thereby lowering the level of service.

The present invention was made in view of the aforementioned points and aims to propose an information process apparatus capable of satisfying both the protection and the usage of information at a high level.

SUMMARY

An information process apparatus disclosed in the application includes a memory part that records original information relating to an image, a conversion process part that converts the original information into concealed information in which at least a piece of the original information is concealed, a concealed information providing part that provides the concealed information to an outside the information process apparatus, and a corresponding information providing processing part that creates corresponding information in which the original information corresponds to the concealed information, and provides the corresponding information to the outside the information process apparatus.

Further, an information process apparatus disclosed in the application includes a memory part that records original information, a conversion process part that converts the original information into concealed information in which at least a piece of the original information is concealed, a concealed information providing part that provides the concealed information to an outside the information process apparatus, a corresponding information creating part that creates corresponding information in which the original information corresponds to the concealed information and a corresponding information providing part that provides the corresponding information to the outside the information process apparatus.

With this, since the correspondence of original information and concealed information can be let known to a provision authorized person, smooth communication via the concealed information can be executed with a provision limited person who only knows the concealed information.

According to the present invention, an information process apparatus capable of satisfying protection and usage of information at a high level can be materialized.

BRIEF DESCRIPTION OF THE DRAWINGS

FIGS. 5A-5C show schematic diagrams showing concealment settings.

FIG. 6 is a schematic diagram showing concealment levels.

FIG. 7 is a schematic diagram showing a display of a concealment setting.

FIG. 8 is a schematic diagram showing a concealment table.

FIGS. 9A-9B are schematic diagrams showing concealment of user information.

FIGS. 10A-10C are schematic diagrams showing concealment and integration of log information.

FIG. 11 is a flowchart showing an information providing process procedure.

FIG. 14 is a schematic diagram showing a command execution process procedure.

FIGS. 15A-15B show schematic diagrams showing seed values and generated IDs.

FIG. 16 is a schematic diagram showing a seed value list.

DETAILED DESCRIPTIONS OF EMBODIMENTS

Hereinafter, embodiments for carrying out the invention (hereinafter referred to as embodiments) will be explained with reference to drawings.

[1. First Embodiment]

[1-1. Structure of Print System]

Figure 1:
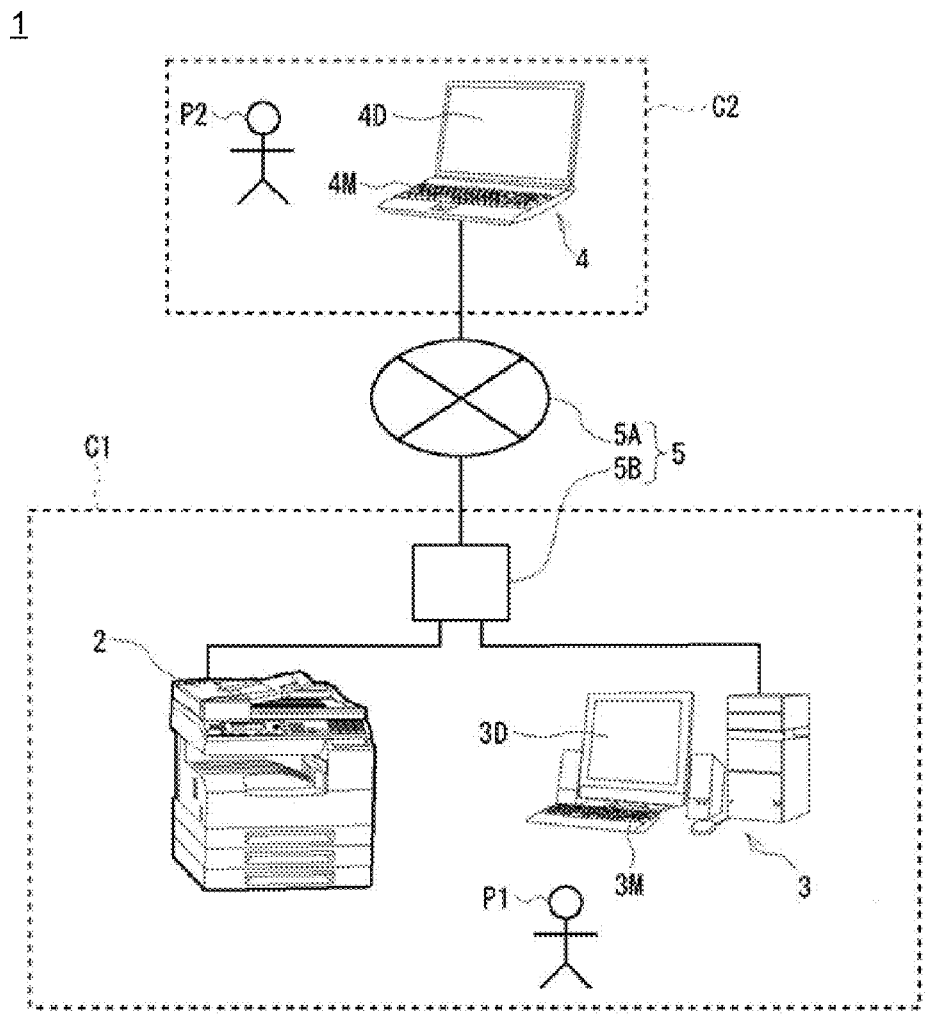
FIG. 1 is a schematic diagram showing a structure of a print system.

As shown in FIG. 1, a print system 1 according to the first embodiment has a structure in which a MFP (Multi Function Printer) 2, a computer 3, and a maintenance device 4 are connected to each other via a network 5. Among them, the MFP 2 and the computer 3 are arranged within a prescribed company C1. The MFP 2 has a plurality of functions (multi function), other than a printer function for performing printing according to instructions from the computer 3, etc., such as a facsimile function, a scanner function, and a copy function. The MFP 2 in this example is an image information process apparatus for processing information relating to an image, and also an image forming apparatus for printing/forming an image on a medium.

The computer 3 is equipped with a display part 3D, an operation part 3M, etc., and in a similar manner as a typical computer, various programs such as an OS (Operation System), web browsers, etc., are executed. The computer 3 is operated by a user P1 as a provision authorized person, who is an employee of a company C1. The maintenance device 4 is a computer equipped with a display part 4D, an operation part 4M, etc., set up at a management company C2 which has a management contract with the company C1 relating to the MFP 2, and is operated by a management operator P2 as a provision limited person, who is an employee of the management company C2.

The network 5 is constituted by the Internet 5A which mutually connects the company C1 and the management company C2 and a network device 5B for connecting the MFP 2, the computer 3, and the Internet 5A to each other in the company C1. The network device 5B is, for example, a router, a hub, etc., to which a plurality of computers 3 and various information devices (not illustrated) are connected. This network 5, for example, transmits a print command and print data from the computer 3 to the MFP 2, transmits on obtain request of a log (which will be detailed later) MFP 2 from the maintenance device 4 to the MFP 2, and transmits the log from the MFP 2 to the maintenance device 4.

The MFP 2 is connected to the computer 3 and the maintenance device 4 via the network 5. Therefore, the MFP 2, when a user P1 or a maintenance operator P2 makes an access via the network 5, for example, from the authentication processing by a user name and a password, an address on a network, etc., recognizes whether or not a person who makes an access is the user P1 or the maintenance operator P2. With respect to the MFP 2, the computer 3, the maintenance device 4 and the network 5 are located at an outside the MFP 2.

Figure 2:
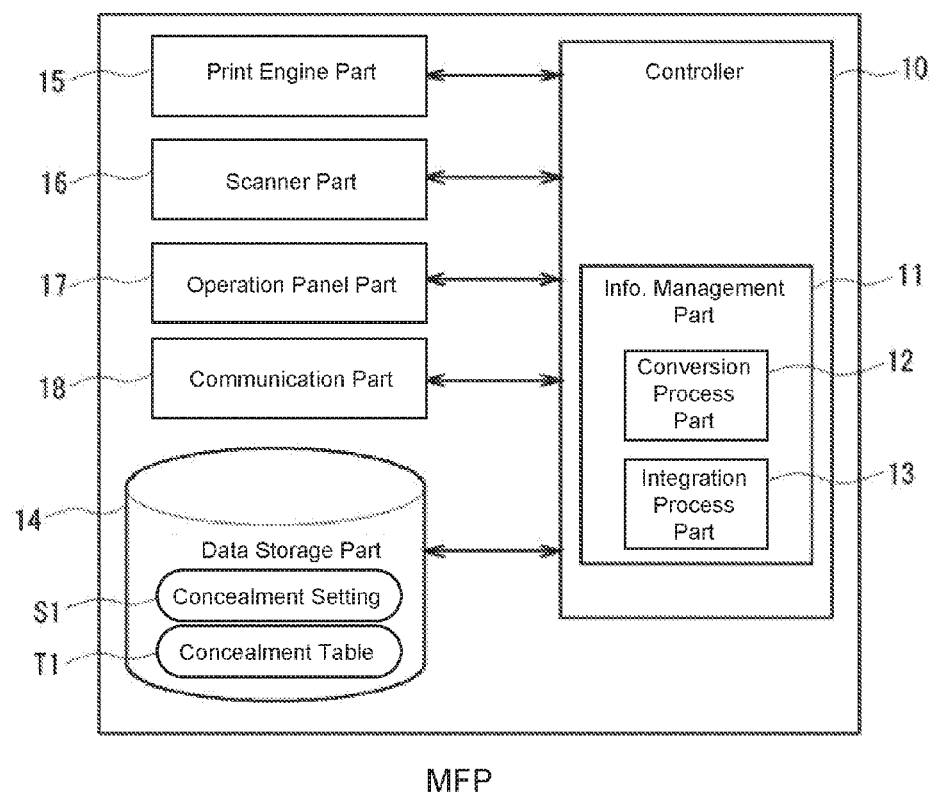
FIG. 2 is a schematic diagram showing a structure of a MFP.

The MFP 2, as shown in FIG. 2, is integrally controlled as a whole by a controller 10. The controller 10 is structured mainly by an unillustrated CPU (Central Processing Unit) and performs various processes such as print processing, information concealment process, etc., by reading a predetermined program from an unillustrated ROM (Read Only Memory), flash memory, etc., and executing it. In the controller 10, an information management part 11 for managing various information is provided. The information management part 11 is further provided with a conversion process part 12 and an integration processing part 13 (to be explained in detail later).

Further, to the controller 10, a data storage part 14, a print engine part 15, a scanner part 16, an operation panel part 17, and a communication part 18 are connected. The data storage part 14 is, for example, a hard disc drive, and records various information, other than information necessary for print processing, such as user information relating to users and log information, which is a history of operations. The print engine part 15 prints an image according to the print data on a sheet as a print medium. The scanner part 16 scans an image printed on a paper, etc., to generate image data.

The operation panel part 17 is constituted by a touch panel in which, for example, a liquid crystal panel and a touch sensor are integrated, displays various information, and receives the users' operation inputs. Further, in the operation panel part 17, in the vicinity of the touch panel, operation keys such as number keys, direction keys, etc., are also provided. The communication part 18 has a cabled or wireless LAN (Local Area Network) interface according the standards of IEEE (Institute of Electrical and Electronics Engineers) 802.3u/ab or IEEE802.11a/b/g/n, etc., and transmits and receives various information via the network 5 (FIG. 1).

In this way, in the print system 1, other than that the MFP 2 executes each process such as printing according to the print command from the computer 3, information is transmitted and received between the maintenance device 4 and the MFP 2 provided outside of the company C1.

[1-2. Basic Overview relating to Notification of Information]

Next, the basic overview relating to processing and notification of information in the print system 1 will be explained. In the MFP 2, information relating to the user (hereinafter referred to as user information), such as a name, a mail address, etc., of a user using a printer, is registered in advance and the user information is recorded in the data storage part 14.

Further, a company C1 lays down policies for handling information that should not be provided to the outside such as user information. Specifically, for a person belonging to the company C1, for example, a user P1 of the computer 3, provision is allowed, but on the other hand, for a person not belonging to the company C1, for example, a maintenance operator P2 who is an employee of the management company C2, provision is limited.

Figure 3:
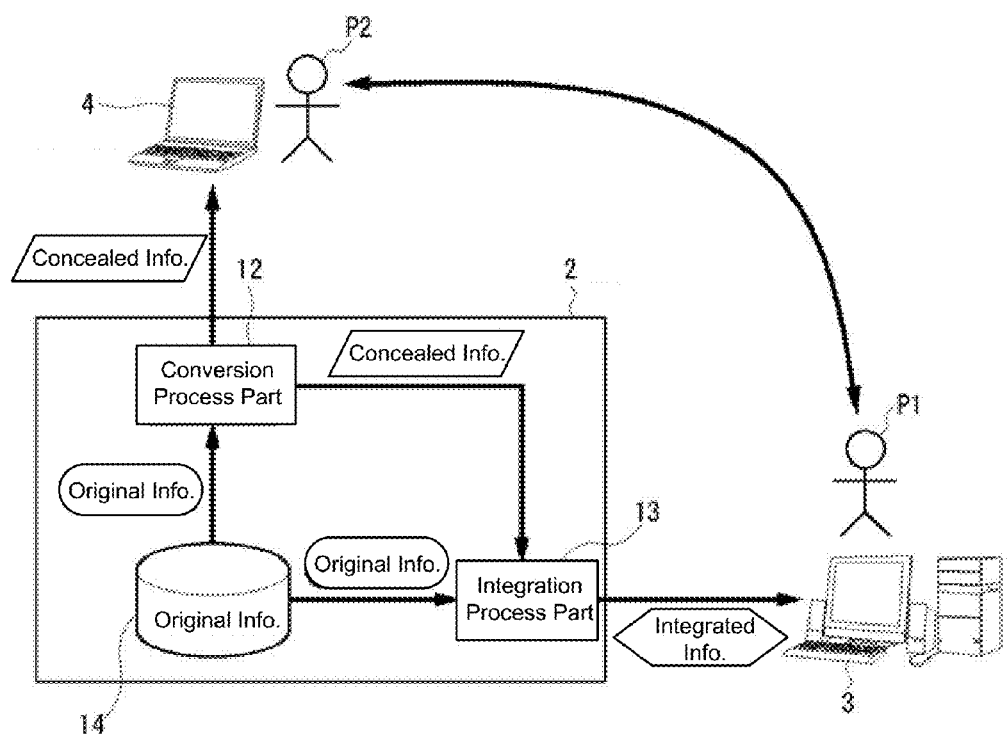
FIG. 3 is a schematic diagram showing communication through notification of integrated information.

Therefore, as shown in FIG. 3, when receiving requests for various information from the maintenance device 4, among the information that should not be provided outside, the MFP 2 converts the original information to concealed information using the conversion process part 12 and transmits the converted information to the maintenance device 4. Hereinafter, information which should not be provided outside will be referred to as a concealment target, and original information and concealed information will be referred to as original information and concealed information, respectively. Further, the MFP 2 generates integrated information in which the original information and the concealed information are corresponded to each other by the integration processing part 13 and notifies this integrated information to the user P1 of the computer 3.

With this, the maintenance operator 2 operating the maintenance device 4 and the user P1 of the computer 3 will both come to know the concealed information. Therefore, it becomes possible for the maintenance operator P2 and the user P1 to communicate with each other via the concealed information while using a communication means such as a telephone, electronic mail etc.

Figure 4:
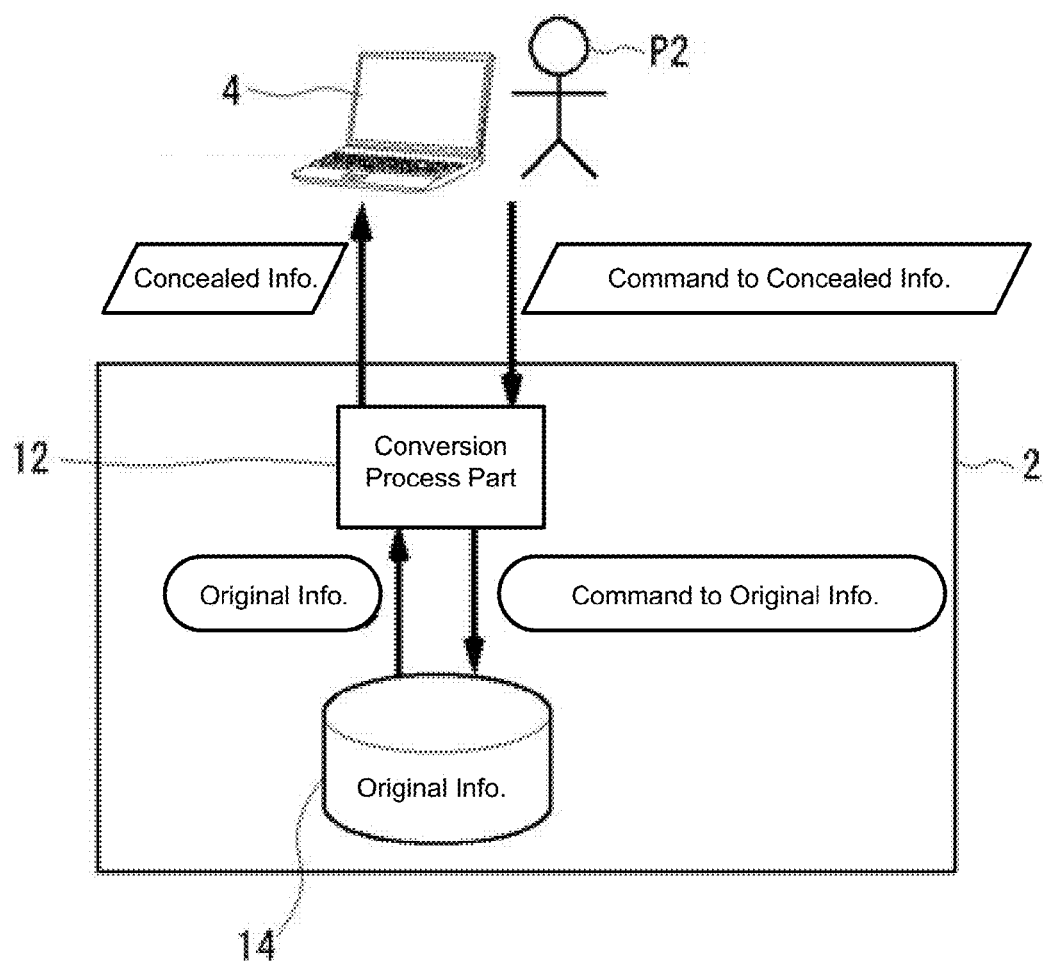
FIG. 4 is a schematic diagram showing an execution of an instruction using concealed information.

Further, as shown in FIG. 4, after receiving an command (or instruction) regarding the concealed information from the maintenance device 4, the MFP 2 inversely converts the concealed information into the original information with the conversion process part 12, and executes the command the original information. With this, the maintenance operator P2 can make the MFP 2 execute the processing relating to the original information without knowing the original information itself.

[1-3. Setting relating to Concealment of Information]

Next, the conversion of a concealment target from the original information into the concealed information in the MFP 2 will be explained. In the data storage part 14 (FIG. 2) of the MFP 2, a concealment setting S1 has been recorded in advance. The concealment setting S1 shows a setting relating to the concealment of information, and as shown in FIGS. 5A, 5B and 5C, it is constituted by three types of settings, concealment settings S1A, S1B and S1C.

The concealment setting S1A stores a setting for whether or not to execute a concealment process by corresponding to types of information recorded in the data storage part 14. Specifically, in the concealment setting S1A, "user information," "log information," etc., are stored as types of information, and "effective" or "ineffective" are stored as setting information expressing whether or not to execute the concealment process for each of them.

The concealment setting S1B stores the concealment levels for which each specific element of information recorded in the data storage part 14 should be subjected for processing. Here, the concealment level stored in the concealment setting S1B expresses a concealment degree of information, in other words, a degree of disclosure of information. Specifically, there are four tiers of concealment levels, as shown in FIG. 6: "complete concealment," "only presence or absence," "distinguishable" and "no concealment."

"Complete concealment" as a complete concealment degree is concealment process which does not provide information at all and information after the conversion is "blank." The blankness indicates that information that can be shown to a maintenance operator P2 does not exist. In this case, the maintenance operator P2 who sees the information after conversion (that is, blank) cannot see not only the specific content of the information but also the presence or absence of information.

"Only presence or absence" as a presence/absence degree provides whether or not any information is present, in other words, whether or not it is blank as information. In the case of "only presence or absence," for example, when information is present, it can be converted to "*", and when information is absent, it can be converted to blank. In this case, a maintenance operator P2 who sees the information after the conversion can see the presence or absence of information even though the information cannot be distinguished from other information.

"Distinguishable" as a distinguishability degree is for converting information before a conversion into information that can be distinguished from other information of the same type. In the case of "distinguishable," for example, user names such as "KATO" and "MATSUMOTO" before conversion are converted to ID (identifiers) such as "U1" and "U2". In this case, the maintenance operator P2 who saw the information after the conversion (that is, ID) can see the presence or absence of information and distinguish the information from other information even though the original information itself cannot be seen. Further, "no concealment" as a non-concealment degree literally means to provide original information without concealing the information.

Further, for the concealment setting S1, seen from another viewpoint, the types of information stored in the concealment setting S1A are elements of information stored in the concealment setting S1B that are grouped and classified, which can be called a "major item" in a sense. On the other hand, the elements of information stored in the concealment setting S1B can be called "minor items" belonging to each group.

In the concealment setting S1C, when providing information that is the target of the concealment process (hereinafter referred to as concealment targets) to the user P1 of the computer 3, as a setting for whether or not to provide concealed information along with the original information (hereinafter referred to as the provision setting for concealed information), "effective" or "ineffective" are stored.

In such a concealment setting S1, for example, the content is displayed and the setting can be changed by the operation panel part 17 (FIG. 2). For example, by displaying the display screen D1 shown in FIG. 7 on the operation panel part 17, the MFP 2 presents the contents of the concealment setting S1 to the user P1. Further, in a state in which the display screen D1 is displayed, by receiving touch operations, key input operations, etc., from the user P1, the MFP 2 changes the setting content to record it.

Furthermore, when the concealment level of the concealment setting S1B (FIG. 5B) is "distinguishable," as shown in FIG. 8, the MFP 2 generates a concealment table T1 in which original information, which is information before the conversion, and concealed information, which is information after the conversion, are corresponded, and records them in the data storage part 14.

For example, it is assumed that user information F1 as shown in FIG. 9A is recorded in the data storage part 14 and the setting information of the concealment setting S1B (FIG. 5B) relating to each element of the user information is "distinguishable". In this case, the conversion process part 12 of the information management part 11 of the controller 10 (FIG. 2) converts each element from the original information to unique concealed information, corresponds the element name, the original information, and the concealed information and stores them in the concealment table T1 (FIG. 8), and records them in the data storage part 14 (FIG. 2).

At this time, in the conversion process part 12, for example, concealed information are unique IDs that are combinations of alphabetic characters and numeral strings, and are commonized only for the alphabetic character parts for each element. Specifically, for example, an alphabetic character "U" is used for the element "user name", an alphabetic character "D" is used for "domain", an alphabetic character "E" is used for the mail account before the symbol "@" for a mail address, and an alphabetic character "D" is used for the mail domain after the symbol "@", respectively.

Here, for example, each element of the user information F1 shown in FIG. 9A is converted from original information to concealed information according to the concealment setting S1 (FIGS. 5A-5C) and the concealment table T1 into user information F2 as shown in FIG. 9B. That is, for the user information F1, in the concealment setting S1A (FIG. 5A), since the "execution of concealment" of "user information" is "effective", each element is converted according to each setting of the concealment setting S1B (FIG. 5B).

Specifically, for user information F2, the user name is converted to "U1", etc., which is concealed information which is "distinguishable", the telephone number is converted to "*" or "blank" which is concealed information indicating "only presence or absence", respectively. Further, for the user information F2, the mail account of the mail address is converted to "E1", etc., which is concealed information which is "distinguishable" and the mail domain is converted to "D1", etc., which is concealed information which is "distinguishable," respectively.

Further, for example, log information L1 as shown in FIG. 10A is converted from original information to concealed information according to the concealment setting S1 (FIGS. 5A-5C) and concealment table T1 (FIG. 8) into log information L2 as shown in FIG. 10B. In this case, for the log information L1, since the "execution of concealment" of "user information" is "ineffective" in the concealment setting S1A (FIG. 5A), each element such as "time" or "function", etc., is not converted in general. However, since each element of "user information" is included in "user name" or "destination" which is included in the log information L1, "execution of concealment" of "user information" is "effective". Therefore, for the log information L1, only such elements are converted according to each setting of the concealment setting S1B (FIG. 5B).

In this way, the MFP 2, according to the concealment setting S1 (FIGS. 5A-5C) and the concealment table T1 (FIG. 8), converts a concealment target from original information to concealed information.

[1-4. Process Relating to Transmitting, Receiving and Concealment of Information]

Next, each of the various process procedures relating to transmitting, receiving, and concealing information in MFP 2 will be explained in detail.

[1-4-1. Process of Providing Information]

First, an information providing process in which the MFP 2 provides information according to requests from the maintenance device 4 will be explained. The controller 10 of the MFP 2, when power is activated, starts the information providing process procedure RT1 shown in FIG. 11 and shifts to Step 1 (shown SP1 in figures). In Step 1, the controller 10 receives a request from the maintenance device 4 (FIG. 1) to obtain information (for example, user information) via the network 5 and shifts to the next 2.

In Step 2, the controller 10 determines whether or not a concealment target is included in user information F1 (FIG. 9A) using the information management part 11 (FIG. 2). Specifically, the information management part 11 determines whether or not the "execution of concealment" of "user information", which is the request information, is "effective" in the concealment setting S1A (FIG. 5A). Further, the information management part 11 also determines whether or not each element included in the user information F1 is set to "complete concealment", "distinguishable" or "only presence or absence" in the concealment setting S1B (FIG. 5B).

Here, when an affirmative result is obtained, information which should be converted into concealed information and provided (that is, concealment target) is included in the user information F1, indicating that it should not be provided without conversion to the maintenance device 4. At this time, the controller 10 shifts to the next Step 3, selects one among concealment target information included in the user information F1 as of-interest information, and shifts to the next Step 4. In Step 4, the controller 10 requests concealed information of the of-interest information to the information management part 11 and shifts to the next Step 5.

In Step 5, the controller 10, using the information management part 11, determines whether or not the concealment level set in the concealment setting S1B (FIG. 5B) is "distinguishable" and unregistered in the concealment table T1 (FIG. 8) for the of-interest information. Here, when an affirmative result is obtained, it indicates that the of-interest information needs to be converted to concealed information and also needs to be registered to the concealment table T1. At this time, the controller 10, by shifting to the next Step 6 and executing a concealed information registration process procedure to be explained later as a sub routine, converts the of-interest information into concealed information and corresponds the concealed information with original information, registers them to the concealment table T1 (FIG. 8), and shifts to the next Step 7.

On the other hand, when a negative result is obtained in Step 5, it indicates that the concealment setting S1B (FIG. 5B) of the of-interest information is "complete concealment" or "only presence or absence" and that it can be converted into concealed information without using the concealment table T1. At this time, the controller 10 shifts to the next Step 7, and by the conversion process part 12 of the information management part 11 and based on the concealment setting S1 (FIGS. 5A-5C) and the concealment table T1 (FIG. 8), converts the of-interest information among the user information from original information to concealed information and shifts to the next Step 8.

In Step 8, the controller 10 determines whether or not unconverted concealment target is included in the user information. Here, when an affirmative result is obtained, by returning to Step 3 to repeat a series of processes, the controller 10 converts the remaining concealment targets included in the user information F1 from original information to concealed information.

On the other hand, when a negative result is obtained in Step 8, it indicates that all concealment targets included in the user information F1 are converted to concealed information to generate user information F2 (FIG. 9B). At this time, the controller 10 shifts to the next Step 9, transmits the user information F2 to the maintenance device 4 via a network 5, shifts to the next Step 11 and completes the information providing process procedure RT1.

On the other hand, when a negative result is obtained in Step 2, it indicates that concealment targets are not included in the user information F1. At this time, the controller 10 shifts to the next Step 10, transmits the user information F1 (FIG. 9A) to the maintenance device 4 via the network 5 without changing, shifts to the next Step 11 and completes the information providing process procedure RT1.

[1-4-2. Registration of Concealed Information to Concealment Table]

Figure 12:
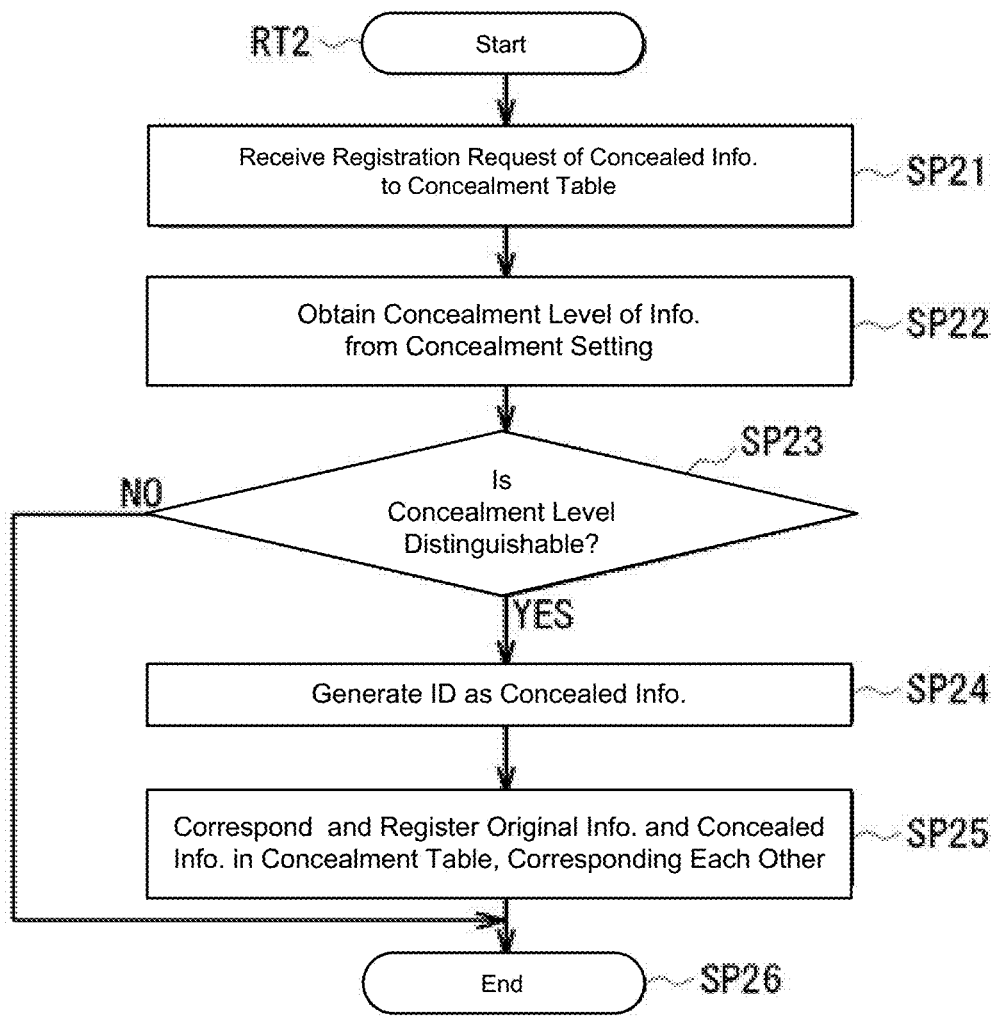
FIG. 12 is a flowchart showing a concealed information registration process procedure into a concealment table.

Next, the concealed information registration process in which the MFP 2 registers concealed information to a concealment table T1 (FIG. 8) will be explained. The information management part 11 (FIG. 2) provided in the controller 10 of the MFP 2, when power is activated, starts a concealed information registration process procedure RT2 as shown in FIG. 12 and shifts to Step 21. In Step 21, the information management part 11, in Step 6 of the information providing process procedure RT1 (FIG. 11), etc., receives a request to convert information (hereinafter referred to as of-interest information) into concealed information for the concealment table T1 and to record them, and shifts to the next Step 22. In Step 22, the information management part 11 obtains the concealment level of the of-interest information by referring to the concealment setting S1 (FIGS. 5A-5C) and shifts to the next Step 23.

In Step 23, the information management part 11 determines whether or not the concealment level obtained for the of-interest information is "distinguishable". Here, when an affirmative result is obtained, it indicates that unique IDs are generated as concealed information and required to be assigned to the of-interest information. At this time, the information management part 11 shifts to the next Step 24.

In Step 24, the conversion process part 12 of the information management part 11 combines alphabetic characters according to the type of of-interest information (that is, "user name", "mail account", etc.) and numbers that are different from other existing concealed information to generate new unique IDs as concealed information of of-interest information and shifts to the next Step 25. In Step 25, the information management part 11 corresponds original information and concealed information of the of-interest information to each other, registers that in the concealment table T1, shifts to the next Step 26, and terminates the concealed information registration process procedure RT2.

On the other hand, when a negative result is obtained, it indicates that the concealment level of the of-interest information is not "distinguishable" and there is no need for the of-interest information to be registered to the concealment table T1. At this time, the information management part 11 shifts to Step 26 to terminate the concealed information registration process procedure RT2.

[1-4-3. Providing Original Information and Concealed Information to Users]

Figure 13:
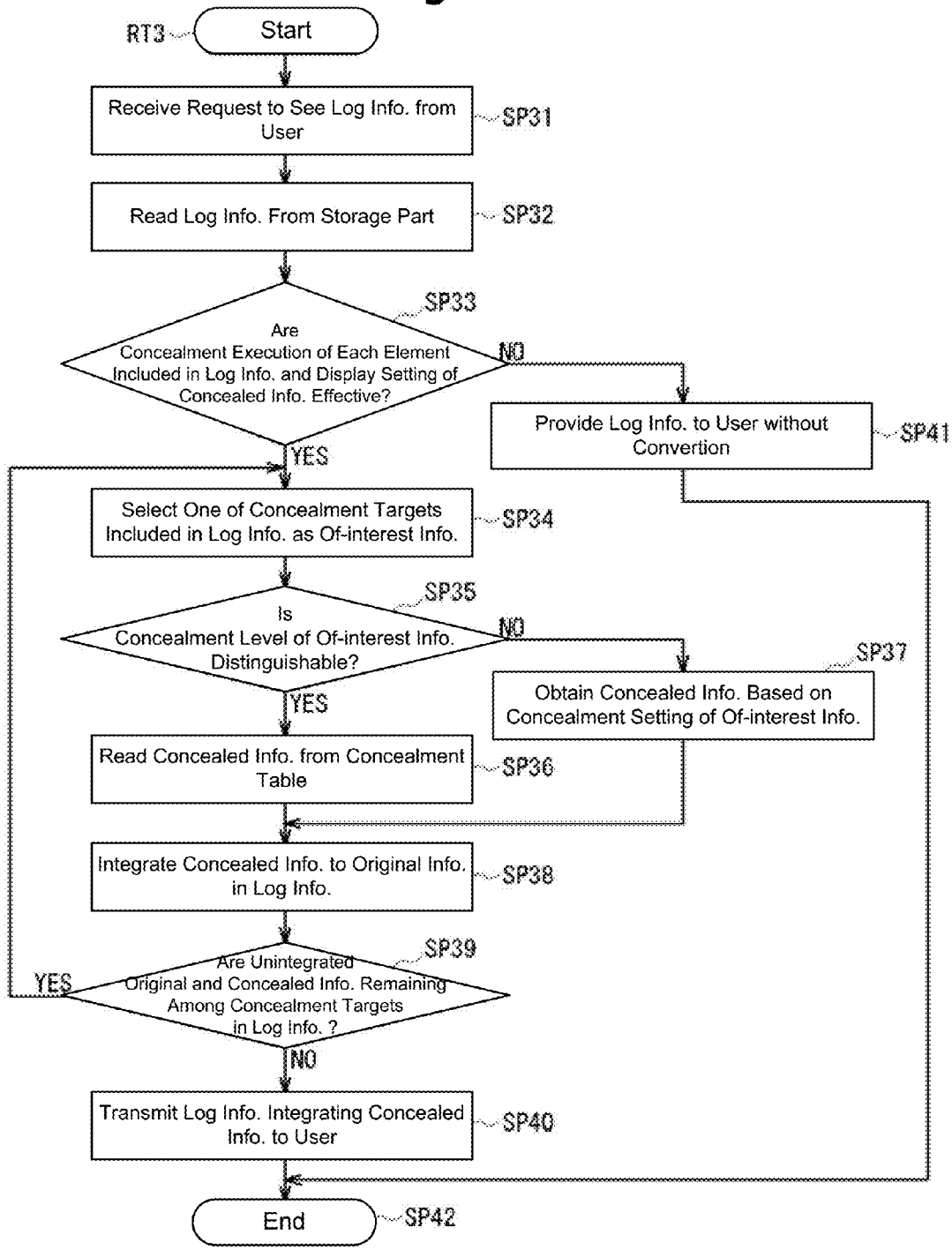
FIG. 13 is a flowchart showing integrated information providing process procedure.

Next, the information integration providing process in which the MFP 2 integrates original information and concealed information and provides it to the user P1 of the computer 3 will be explained. Here, a case in which log information is provided to the user P1 is assumed. The controller 10 of the MFP 2, when power is activated, starts the information integration providing process procedure RT3 as shown in FIG. 13 and shifts to Step 31.

In Step 31, the controller 10 receives a request to see log information from the computer 3 via the network 5 and shifts to the next Step 32. In Step 32, the controller 10 reads log information L1 from the data storage part 14 by the information management part 11 and shifts to the next Step 33. In Step 33, the controller 10, by referring to the concealment setting S1 (FIGS. 5A-5C) with the information management part 11, determines whether or not that the execution of concealment of each element included in the log information L1 (FIG. 10A) is "effective" and the display setting of the concealed information, that is, an item of the concealment setting S1C, "display concealed information also while concealed information is provided" of the concealment setting S1C, is "effective".

When an affirmative result is obtained in Step 33, there is a possibility that information included in log information is converted from original information to concealed information and provided to the maintenance device 4 (FIG. 1), indicating that both the original information and the concealed information should be presented to the user P1. At this time, the controller 10 shifts to the next Step 34. In Step 34, the controller 10 selects one of the concealment targets included in the log information L1 with the information management part 11 as of-interest information and shifts to the next Step 35.

In Step 35, the controller 10 sees the concealment setting S1B (FIG. 5B) with the information management part 11 and determines whether or not the concealment level of the of-interest information is "distinguishable". Here, when an affirmative result is obtained, it indicates that concealed information of the of-interest information is registered in the concealment table T1. At this time, the controller 10 shifts to the next Step 36, reads concealed information of the of-interest information from the concealment table T1 with the information management part 11 and shifts to the next Step 38.

On the other hand, when a negative result is obtained in Step 35, it indicates that the concealment setting of the of-interest information is either "complete concealment" or "only presence or absence". At this time, the controller 10 shifts to the next Step 37, obtains the concealed information according to the concealment setting of the of-interest information with the conversion process part 12 of the information management part 11 and shifts to the next Step 38. In this case, the concealed information will either be the symbol "*" or "blank".

In Step 38, the controller 10 integrates original information and concealed information of the of-interest information in the log information with the integration processing part 13 (FIG. 2) and shifts to the next Step 39. At this time, the integration processing part 13 generates integrated information in which concealed information is jointly written with original information, such as, for example, "KATO (U1)" when the original information is user name "KATO" and the concealed information is "U1". Also, in cases where concealed information is "blank", the integration processing part 13 generates integrated information such as "KATO ( )". This integrated information becomes information showing the correspondence of original information and the concealed information.

In Step 39, the controller 10 determines whether or not unintegrated original information and concealed information are remaining in the log information among the concealment targets. Here, when an affirmative result is obtained, the controller 10 sequentially integrates original information and concealed information of the remaining concealment targets by returning to Step 34 again.

On the other hand, when a negative result is obtained in Step 39, it indicates that original information and concealed information in all concealment targets among the log information have been integrated. At this time, the controller 10 shifts to the next Step 40 and as shown in FIG. 10C, transmits log information L3, in which original information and concealed information of all concealment targets are integrated, to the computer 3, to display them on the display part 3D (FIG. 1). With this, the user P1 can visually recognize the log information L3, that is, can be provided with the log information L3. After that, the controller 10 shifts to the next Step 42 and terminates the information integration providing process procedure RT3.

Further, when a negative result is obtained in Step 33, it indicates that there is a possibility that log information was provided to the maintenance device 4 (FIG. 1) without conversion or there is a possibility that log information L2 (FIG. 10B) converted into concealed information was provided to the maintenance device 4, however, it indicates that there is no need to present the concealed information to the user P1. At this time, the controller 10 shifts to the next Step 41 and transmits log information L1 (FIG. 10A), in which each information is not converted to concealed information, to be displayed on the display part 3D. With this, the user P1 can visually recognize the log information L1. After that, the controller 10 shifts to the next Step 42 and terminates the information integration providing process procedure RT3.

[1-4-4. Command Execution Process Procedure]

Next, a command execution process in which the MFP 2 receives and executes a command (instruction) from the maintenance device 4 will be explained. Here, for example, a case in which the setting of access rights as user information, and specifically, the setting for permission for print processing and permission for copy processing, etc., are changed, is assumed. The controller 10 of the MFP 2, when power is activated, starts a command execution process procedure RT4 as shown in FIG. 14 and shifts to Step 51.

In Step 51, the controller 10 receives requests to execute commands from the maintenance device 4 and shifts to the next Step 52. In Step 52, the controller 10 interprets a command that was received and shifts to the next Step 53. At this time, by recognizing the types of commands and execution targets, etc., the controller 10 recognizes, for example, the types of command as "change in settings of access rights", a subject of execution as user "U1", and the content of the execution as "authorizing print processing".

In Step 53, the controller 10 determines whether or not concealed information is included in a command. Here, when an affirmative result is obtained, the controller 10 shifts to the next Step 54, and determines whether or not the concealment level of the concealed information is distinguishable. Here, when an affirmative result is obtained, it indicates that although the received command cannot be correctly executed as it is, it can be executed if the concealed information is inversely converted into original information. At this time, the controller 10 shifts to the next Step 55.

In Step 55, by referring to the concealment table T with the information management part 11, the controller 10 reads and obtains original information corresponded with concealed information and shifts to the next Step 56. In Step 56, after replacing concealed information in the command that was interpreted in Step 52 with original information with the conversion process part 12 of the information management part 11, the controller 10 executes a process according to the command. After that, the controller 10 shifts to the next Step 58 to complete the command execution process procedure RT4.

On the other hand, when a negative result is obtained in Step 53, it indicates that a command can be executed as it is. At this time, after shifting to the next Step 57 and executing the command, the controller 10 shifts to the next Step 58 and terminates the command execution process procedure RT4.

Further, when a negative result is obtained in Step 54, since the symbol "*" and "blank" as concealed information are included in the command, it indicates that the concealed information cannot be restored to the original information, that is, that the command cannot be correctly executed. At this time, the controller 10 shifts to Step 58 and completes the command execution process procedure RT4 without executing the command. Also, at this time, the controller 10 transmits a predetermined error message to the maintenance device 4 to notify the maintenance operator P2 that the command could not be executed.

[1-5. Operation and Effects]

In the aforementioned configurations, the MFP 2 of the print system 1 according the first embodiment converts a concealment target from original information to concealed information according to the concealment setting 51 (FIGS. 5A-5C) and provides it to a maintenance device 4. With this, since the MFP 2 will not provide original information to an outside person such as a maintenance operator P2 operating the maintenance device 4, the original information will not be leaked to the outside.

Further, when the concealment level is "distinguishable," the MFP 2 generates unique IDs for each information and assigns them as concealed information. With this, since the maintenance operator P2 can distinguish the concealed information from other concealed information, a relatively high level of maintenance operation may be performed while distinguishing each information without directly seeing the original information.

Furthermore, when providing information to the computer 3, the MFP 2 displays integrated information in which original information and concealed information are integrated onto the display part 3D. With this, the MFP 2 can make a user P1 recognize the correspondence of original information and concealed information. As a result, the maintenance operator P2 who only knows concealed information can communicate with the user P1 using the concealed information and perform an especially high level of maintenance operation.

Especially, when providing log information to the computer 3, the MFP 2 integrates information such as user names and mail addresses, etc. (that is, concealment targets), in a manner in which each original information is corresponded to concealed information, and provides log information L3 (FIG. 10C). The log information L3, in comparison to the log information L2 (FIG. 10B) which is visually recognized by the maintenance operator P2, has the same display sequence for each concealed information, layout, etc., and has a display content in which the original information is added. Therefore, by visually recognizing the log information L3, the user P1 can provide necessary information to a maintenance operator P2 while smoothly communicating with the maintenance operator P2 who only sees the concealed information.

Further, depending on whether or not an item "display concealed information also while concealed information is provided" of the display setting of concealed information, that is, the concealment setting S1C (FIG. 5C) is "effective", the MFP 2 switches information to be notified to a user P1 to integrated information or only original information. Therefore, for example, the MFP 2 requests all maintenance operations to the maintenance operator P2, and in a case in which inquiries, etc., are not received, only the necessary original information can be notified to the user P1 and confusion from presenting unnecessary information can be prevented and avoided.

Furthermore, when concealed information is "blank", "( )" is jointly written with original information instead of only original information. With this, the MFP 2 displays "KATO" when the concealment setting is "no concealment" and original information is notified without conversion, and displays "Kato ( )" when the concealed information is "blank", so the user P1 can easily distinguish between them.

Further, the MFP 2 can set whether or not the concealment process can be executed for each type of information such as "user information" and "log information" with the concealment setting S1A (FIG. 5A). Therefore, when the MFP 2, for example, wants to temporarily disclose all user information according to the content of a maintenance operation, etc., the concealment process of the user information can be set to "ineffective" without separately changing the concealment setting for each information. Furthermore, when wanting to conceal user information again after completion of the operation, etc., that is, to return to the original setting, the concealment process of the user information is set to "effective", and again, there is no need to separately change the concealment setting of each information.

Furthermore, the MFP 2 can set four tiers of concealment levels such as "complete concealment", "only presence or absence", "distinguishable", and "no concealment" as the degrees of concealment (FIG. 6). For this reason, by finely setting the concealment levels depending on the degree in which each information can be disclosed for a maintenance operator P2, etc., the MFP 2 can assuredly conceal information that should not be disclosed while notifying only the minimum amount of information that is necessary for the maintenance operation.

Further, for information in which the concealment level is "distinguishable", the MFP 2 corresponds and stores original information and concealed information in the concealment table T1, and when converting from original information to concealed information, only in a case in which the original information and the concealed information are not registered in the concealment table T1, generates concealed information and registers them. Therefore, the MFP 2 can keep the generation process of concealed information to the minimum necessary, and also in a case when notifying of integrated information to a user P1, the concealment table T1 can be used.

Furthermore, when the MFP 2 receives an instruction (command) including concealed information from a maintenance device 4, when the concealed information is distinguishable, the MFP 2 refers to the concealment table T1 and executes the command after replacing with original information. Therefore, the MFP 2 can execute a process according to the command including concealed information without notifying a maintenance operator P2 with original information, and thereby making it possible to realize a high level of maintenance operation by a maintenance operator P2.

According to the aforementioned configuration, when the MFP 2 provides information to an outside maintenance device 4, according to the concealment setting S1, when the concealment level is "distinguishable", the MFP 2 converts each information into unique concealed information that are distinguishable from each other before providing them. Further, when the MFP 2 provides information to the computer 3, it displays integrated information in which original information and concealed information are integrated onto the display part 3D. With this, the MFP 2 can make the user P1 recognize the correspondence of original information and concealed information. As a result, the maintenance operator P2 who only sees concealed information can communicate with the user P1 using the concealed information and perform an especially high level of maintenance operation.

[2. Second Embodiment]

In the second embodiment, the ID that is generated as concealed information when the concealment level is "distinguishable" is different from the first embodiment. Specifically, the controller 10 of the MFP 2, for the conversion process part 12 of the information management part 11, commonly uses "U" and "E", etc., depending on the type of information as alphabetical characters at the front of IDs in a similar manner as the first embodiment. On the other hand, the conversion process part 12 generates and assigns random numbers for the numbers that follow the alphabetic characters. Specifically, when the conversion process part 12 generates the random numbers, a value designated by a user P1 is used as a seed value, and for example, four-digit numbers are sequentially generated by a predetermined hash function.

For example, the conversion process part 12, as shown in FIG. 15A, when a seed value "1111" is designated by the user P1, sequentially computes numerical values "3994", "6107", "2350" by applying a predetermined hash function to the seed value. Next, the conversion process part 12 sequentially generates IDs "U3994", "U6107", "U2350", etc., by combining the number with the alphabetic character "U" corresponding to the user name, as concealed information.

With this, since the MFP 2 can sequentially generate IDs in which the numerical portions are discontinuous as concealed information, it makes it difficult for the maintenance operator P2 to take action which may lead to information leak such as speculating the user from the ordering of the numerical portion.

Furthermore, as shown in FIG. 15B, in case in which a seed value "3456" which is different from "1111" is designated by a user P1, the conversion process part 12 sequentially computes numerical values "1182", "5468", "7003", etc., that are different from before by applying a predetermined hash function to the seed value. Next, by using them, the conversion process part 12 sequentially generates IDs "U1182", "U5468", "U7003", etc., as concealed information.

With this, since the MFP 2 can sequentially generate IDs in which the numerical portion is discontinuous and is different from before, as concealed information, it can make it difficult for a maintenance operator P2 to take action which may lead to information leak such as estimating a user from the same numerical portion as before.

Furthermore, the information management part 11, as shown in FIG. 16, records the seed values designated by a user P1 to the seed value list LS as history. Also, for the conversion process part 12, when allowing a user P1 to designate a seed value, it is possible to designate an arbitrary value, and also to select a past seed value while referring to dates and times of the seed value list LS.

Here, because of the properties of the hash function, when the seed values are the same, values can be sequentially calculated with the same pattern. For example, in case of FIG. 15A, when the seed value is "1111", the computed numerical value will always be in a pattern of "3994", "6107", and "2350".

Therefore, for example, by intentionally letting a user P1 designate the same seed value as before, the MFP 2 can generate the same concealed information (that is, ID) as before. With this, the MFP 2 allows the maintenance operator P2 to easily compare the previously provided log information L2 and the current log information L2, thereby increasing the level of the maintenance operation.

In this way, the MFP 2 of the second embodiment, when the concealment setting is "distinguishable", computes a random value from a hash function based on the seed value and uses it as an ID. From this, the MFP 2, in comparison to the first embodiment, can significantly reduce the risk in which information of the concealment target will be known to an outside person, and when necessary, increase the efficiency and the accuracy of the maintenance operation by fixing the pattern of the value.

[3. Other Embodiments]

In addition, in the abovementioned embodiments, by generating integrated information and providing them to the computer 3 and by displaying the integrated information on a display part 3D (FIG. 1), a case in which the correspondence of original information and concealed information is notified to a user P1 was explained. However, the present invention is not limited to that, and for example, by letting a user P1 operate the operation part 17 (FIG. 2) of the MFP 2, integrated information can be displayed on the operation panel part 17, or the integrated information can be printed on paper to be notified to the user P1.

In the abovementioned embodiment, a case in which, by generating integrated information in which original information and concealed information are jointly written and displaying the integrated information on the display part 3D of the computer 3 (FIG. 1), the correspondence of original information and concealed information was notified to a user P1, was explained. However, the present invention is not limited to that, and for example, by displaying log information L1 and L2 by arranging them on the same screen, or by displaying the concealment table T1 without conversion, the correspondence of original information and concealed information can be notified to a user P1. Or, for example, only the original information can be emphasized and displayed (colored, underlined, bold, etc.) on the display part 3D of the computer 3, and in case in which a cursor, etc., is brought over the original information or a click operation is received from an operation by the user P1, concealed information can be displayed by a display such as a pop-up display, display on a status bar, toast display, separate window display, etc., to notify the correspondence of them.

Further, in the abovementioned embodiment, when generating integrated information in Step 38 of the information integration providing process procedure RT3, a case in which "( )" is added to original information when the concealed information is "blank" was explained. However, the present invention is not limited to that, and for example, when concealed information is "blank", a predetermined symbol such as "(–)" can be added to the original information or it can be notified by words such as "(blank)" that it is blank.

Furthermore, in the abovementioned embodiments, a case in which the concealment target of user information F1 (FIG. 9A) is converted by information providing process procedure RT1 (FIG. 11) to concealed information as user information F2 (FIG. 9B) and provided to a maintenance device 4 was explained. However, the present invention is not limited to that, and for example, the concealment target of log information L1 (FIG. 10A) can be converted to concealed information as log information L2 (FIG. 10B) and provided to the maintenance device 4.

Further, in the abovementioned embodiments, a case in which, depending on the setting for providing concealed information of the concealment setting S1C (FIG. 5C), for example, only original information can be provided to a user P1 of the computer 3 in a similar manner as log information L1 of FIG. 10A, or integrated information is provided as with log information L3 of FIG. 10C was explained. However, the present invention is not limited to that, and for example, the setting for providing concealed information can be omitted and only integrated information can be provided to the user P1 unconditionally.

Furthermore, in the abovementioned embodiments, a case in which concealed information is displayed on the display part 4D of the maintenance device 4 provided for a management company C2 (FIG. 1) was explained. However, the present invention is not limited to that, and for example, in case a maintenance operator P2 goes to a company C1 (FIG. 1) and performs a maintenance operation by directly operating a MFP 2, after going through a predetermined authentication processing, concealed information can be displayed on the operation panel part 17 of the MFP 2 (FIG. 2).

Furthermore, in the abovementioned embodiments, a case in which there were four tiers of concealment levels, "completely concealed", "only presence or absence", "distinguishable", and "no concealment" was explained (FIG. 6). However, the present invention is not limited to that, and the concealment level can be three tiers or less or five tiers or more. Also, as other concealment levels, for example, "partial concealment", in which only a portion of information is replaced with a symbol such as "*" or "all character replacement" in which all characters constituting the information is replaced with a symbol such as "*" can be set. Or, the concealment level can be only one tier, so that only whether or not to conceal is set for each information.

Also, in the abovementioned embodiments, a case in which original information and concealed information are corresponded and registered in the concealment table T1 when the concealment level is "distinguishable" was explained. However, the present invention is not limited to that, and concealed information can be generated for each occasion without generating a concealment table T1.

Furthermore, in the abovementioned embodiments, as in Step 6 of the information providing process procedure RT1 (FIG. 11), a case in which concealed information is generated after there is a need to provide information (concealment target) in which the concealment level is "distinguishable" to the outside was explained. However, the present invention is not limited to that, and for example, during a waiting status in which a printer function, a facsimile function, etc., are not executed, the concealed information registration process procedure RT2 (FIG. 12) can be executed to sequentially generate concealed information to be registered in the concealment table T1. With this, the MFP 2 can reduce the necessary processes when a request to be provided with information is received from the maintenance device 4, thereby allowing to shorten the time until it is provided.

Furthermore, in the abovementioned embodiments, a case in which whether or not to perform a concealment process for each type of information is set by the concealment setting S1A (FIG. 5A) was explained. However, the present invention is not limited to that, and for example, the concealment setting S1A can be omitted and only the concealment level can be set for each specific element of information with the concealment setting S1B (FIG. 5B).

Further, in the abovementioned embodiments, a case in which information recorded in the data storage part 14 (FIG. 2) of the MFP 2 was provided to an outside maintenance device 4 and a computer 3 in a company was explained. However, the present invention is not limited to that, and for example, it can be used for a case in which information is provided from an information process apparatus such as a server device, etc., which maintains various information inside, to the outside or within a company (that is, persons to whom information can be disclosed without concealment.

Furthermore, the present invention is not limited to each of the aforementioned embodiments and other embodiments. That is, the range of applicability of the present invention extends to embodiments in which a portion or the entirety of each of the abovementioned embodiments and other abovementioned embodiments are arbitrarily combined or in which a portion is extracted.

Further, in the abovementioned embodiments, a case in which a MFP 2 as an information process apparatus is constituted by a print engine part 15 as an image forming part, a data storage part 14 as a memory part, a conversion process part 12 as a conversion process part, a communication part 18 as a communication part, an information management part 11 as a concealed information providing part, an information management part 11 as a corresponding information providing processing part and a corresponding information creating part, and an integration processing part 13 was explained. However, the present invention is not limited to that, and the information process apparatus can be constituted with an image forming part having other various configurations, a memory part, a conversion process part, a communication part, a concealed information providing part, and a corresponding information providing processing part.

The present invention can be used for various information process apparatuses for recording various information and providing the information according to requests.

What is claimed is:

1. An information process apparatus, comprising:
   a computing device; and
   a non-transitory storage medium containing program instructions for operating:
      a memory part that records original information;

a conversion process part that converts the original information into concealed information in which at least a piece of the original information is concealed;
a concealed information providing part that provides the concealed information to outside the information process apparatus; and
a corresponding information providing processing part that
creates corresponding information in which the original information corresponds to the concealed information, and
provides the corresponding information to the outside the information process apparatus,
wherein:
the original information is configured with a plurality of items which are divided into several groups, each of the items belonging to one of the groups,
the memory part records a concealment setting for designating whether or not to conceal each of the groups, and
the conversion process part converts the original information into the concealed information by executing a concealing process to the items, each item belonging to one of the groups to which concealment was designated by the concealment setting.

2. The information process apparatus according to claim 1, wherein
the concealed information is configured with a concealed item that was executed by the concealing process and a remaining item that was not executed by the concealing process.

3. The information process apparatus according to claim 1, wherein
the memory part records a concealment degree which expresses how much the original information is concealed, and
the conversion process part converts the original information into the concealed information according to the concealment degree recorded in the memory part.

4. The information process apparatus according to claim 3, wherein
the concealment degree includes a plurality of levels;
the original information includes first identification information and second identification information distinguishable from the first identification information;
the concealed information includes third identification information and fourth identification information; and
the conversion process part converts the original information into the concealed information by converting the first identification information into the third identification information and converting the second identification information into the fourth identification information.

5. The information process apparatus according to claim 4, wherein
one of the levels is a first level in which the third identification information is distinguishable from the fourth identification information.

6. The information process apparatus according to claim 4, wherein
one of the levels is a second level in which the third identification information is not distinguishable with the fourth identification information,
a user is able to determine whether the first identification information and the second identification information are present.

7. The information process apparatus according to claim 4, wherein
one of the levels is a third level in which the third identification information is not distinguishable with the fourth identification information,
a user is able to discriminate whether the first identification information and the second identification information are present.

8. The information process apparatus according to claim 4 wherein
one of the levels is a fourth level in which the concealed information providing part provides the original information without converting the first identification information and the second identification information.

9. The information process apparatus according to claim 1, wherein
the memory part further records a concealed information provision setting expressing whether or not to provide the concealed information, and
the corresponding information providing processing part, according to the concealed information provision setting, provides the corresponding information.

10. The information process apparatus according to claim 1, further comprising:
an instruction receiving part that receives an instruction including at least a piece of the concealed information;
an inverse conversion process part that inversely converts the concealed information into the original information based on the instruction.

11. An information process apparatus, comprising:
a memory that records original information;
a CPU (Central Processing Unit) that:
converts the original information into concealed information in which at least a piece of the original information is concealed,
creates corresponding information in which the original information corresponds to the concealed information,
an interface that:
provides the concealed information and the corresponding information to outside the information process apparatus,
wherein:
the original information is configured with a plurality of items which are divided into several groups, each of the items belonging to one of the groups,
the memory records a concealment setting for designating whether or not to conceal each of the groups, and
the CPU converts the original information into the concealed information by executing a concealing process to the items, each item belonging to one of the groups to which concealment was designated by the concealment setting.

12. An information process apparatus, comprising:
a computing device; and
a non-transitory storage medium containing program instructions for operating:
a memory part that records original information;
a conversion process part that converts the original information into concealed information in which at least a piece of the original information is concealed;
a concealed information providing part that provides the concealed information to outside the information process apparatus; and
a corresponding information providing processing part that creates corresponding information in which the original information corresponds to the concealed information, and provides the corresponding information to the outside the information process apparatus;

wherein:

the original information includes first identification information and second identification information distinguishable from the first identification information;

the concealed information includes third identification information and fourth identification information distinguishable from the third identification information;

the conversion process part converts the original information into the concealed information by converting the first identification information into the third identification information and converting the second identification information into the fourth identification information; and in the corresponding information, the first identification information corresponds to the third identification information and the second identification information corresponds to the fourth identification information.

13. The information process apparatus according to claim 12, wherein the corresponding information includes the first identification information, the second identification information, the third identification information and the fourth identification information.

14. The information process apparatus according to claim 12, wherein the first identification information and the second identification information are user identification information for identifying a user.

15. The information process apparatus according to claim 14, wherein the third identification information and the fourth identification information are user identification information for identifying a user.

* * * * *